(12) United States Patent
Kenney

(10) Patent No.: US 7,260,094 B1
(45) Date of Patent: Aug. 21, 2007

(54) LOCALIZATION OF CLIENTS AND SERVERS

(75) Inventor: William Kenney, Weston, VA (US)

(73) Assignee: AOL LLC, Dulles, VA (US)

( * ) Notice: Subject to any disclaimer, the term of this patent is extended or adjusted under 35 U.S.C. 154(b) by 0 days.

(21) Appl. No.: 09/582,261

(22) PCT Filed: Dec. 22, 1998

(86) PCT No.: PCT/US98/27217

§ 371 (c)(1),
(2), (4) Date: Oct. 10, 2000

(87) PCT Pub. No.: WO99/34305

PCT Pub. Date: Jul. 8, 1999

(51) Int. Cl.
*H04L 12/56* (2006.01)

(52) U.S. Cl. ...................................... 370/389; 709/217

(58) Field of Classification Search ................ 370/352, 370/353, 354, 355, 356, 389, 390, 392, 432, 370/486, 487; 707/3; 709/203, 217, 219
See application file for complete search history.

(56) References Cited

U.S. PATENT DOCUMENTS

| | | | |
|---|---|---|---|
| 5,481,710 A | | 1/1996 | Keane et al. |
| 5,717,860 A | | 2/1998 | Graber et al. |
| 5,946,687 A | * | 8/1999 | Gehani et al. ................ 707/10 |
| 5,999,882 A | * | 12/1999 | Simpson et al. .............. 702/3 |
| 6,122,658 A | * | 9/2000 | Chaddha .................... 709/203 |
| 6,128,663 A | * | 10/2000 | Thomas ...................... 709/228 |
| 6,151,631 A | * | 11/2000 | Ansell et al. ................ 709/229 |
| 6,195,691 B1 | * | 2/2001 | Brown ........................ 709/219 |
| 6,208,995 B1 | | 3/2001 | Himmel et al. |

(Continued)

FOREIGN PATENT DOCUMENTS

| | | |
|---|---|---|
| EP | 0643541 A2 | 3/1995 |
| EP | 0645688 A1 | 3/1995 |
| EP | 0749081 A1 | 12/1996 |
| EP | 0862304 A2 | 9/1998 |
| WO | WO96/42145 | 12/1996 |
| WO | WO97 25804 | 7/1997 |

OTHER PUBLICATIONS

"Routing of Incoming Calls in An X.25 System," IBM Technical Disclosure Bulletin, vol. 32, No. 11, Apr. 1990, pp. 370-372.

(Continued)

*Primary Examiner*—Chi Pham
*Assistant Examiner*—Anh-Vu Ly
(74) *Attorney, Agent, or Firm*—Fish & Richardson P.C.

(57) ABSTRACT

A data transfer method includes receiving terminal server identification data at a host system from a terminal server, querying a database to obtain localized information service data associated with the terminal server identification data, and sending the localized information service data from the host system to the terminal server. A host system providing localized information system data includes a database system, a network interface, and a processor. The database system includes records to associate terminal server identification data with information service data. The interface couples the host system to a communications link over which the host system can exchange data with a terminal server. The processor is coupled to the interface and to the database and is configured to receive terminal server identification data from the data interface, to query the database for localized information service data associated with the terminal server identification data, and to send the localized information service data obtained by the query to the data interface for transmission to the terminal server.

24 Claims, 3 Drawing Sheets

U.S. PATENT DOCUMENTS

| | | |
|---|---|---|
| 6,310,630 B1 | 10/2001 | Kulkarni et al. |
| 6,442,577 B1 * | 8/2002 | Britton et al. .............. 709/218 |
| 6,544,295 B1 | 4/2003 | Bodnar |
| 6,546,488 B2 * | 4/2003 | Dillon et al. ............... 709/204 |
| 6,769,009 B1 * | 7/2004 | Reisman ..................... 709/201 |
| 2002/0026349 A1 * | 2/2002 | Reilly et al. .................. 705/14 |

OTHER PUBLICATIONS

M. Bieber et al., "Fourth generation hypermedia: some missing links for the World Wide Web", International Journal of Human-Computer Studies, Jul. 1997, Academic Press, UK, vol. 47, No. 1, pp. 31-65, XP002101194.

L. Tauscher et al., "How people revisit web pages: empirical findings and implications for the design of history systems", International Journal of Human-Computer Studies, Jul. 1997, Academic Press, UK, vol. 47, No. 1, pp. 97-137, XP002101195.

M. Bieber, "Providing information systems with full hypermedia functionality", Proceeding of the Twenty-Sixth Hawaii International Conference on System Sciences (CAT. No. 93TH0501-7), Wailea, HI, USA, Jan. 5-8, 1993, pp. 390-400, vol. 3, XP002101196.

Ichiro Ida et al., "Duet: An Agent-Based Personal Communications Network," IEEE Communications Magazine, IEEE Service Center, Piscataway, N.J., vol. 33, No. 11, Nov. 1, 1995, pp. 44-49 (XP000545284).

* cited by examiner

LOCALIZATION OF CLIENTS AND SERVERS

BACKGROUND

Data service providers can use centralized host computer systems to provide customized information service data to users at remote client computers. The information service data may be localized. That is, the host computer may send data to a user at a remote client computer that is specific to a particular geographic or logical location. For example, a host computer can provide localized weather service data to users at client computers throughout a country. To localize the weather data, the host system can select different weather data depending on the geographic location of the client computer. Data localization techniques may require that a user identify the location of interest. For example, a user may be prompted to enter address, phone number, zip code or other location identification data needed by a host system to localize data for the particular user.

SUMMARY

Localization of information service data provided by an information service host computer system to users at remote client computer systems can be facilitated by automatically determining a geographic or logical location associated with the client computer system. The automatic determination of a location can be achieved using data identifying the terminal server through which a client computer accesses the host system or computer network.

In general, in one aspect, the invention features a data transfer method. The method includes receiving terminal server identification data at a host system from a terminal server, querying a database to obtain localized information service data associated with the terminal server identification data, and sending the localized information service data from the host system to the terminal server.

In general, in another aspect, the invention features a computer host system. The host system includes a database system, a network interface, and a processor. The database system includes records to associate terminal server identification data with information service data. The interface couples the host system to a communications link over which the host system can exchange data with a terminal server. The processor is coupled to the interface and to the database and is configured to receive terminal server identification data from the data interface, to query the database for localized information service data associated with the terminal server identification data, and to send the localized information service data obtained by the query to the data interface for transmission to the terminal server.

In general, in another aspect, the invention features a computer program residing on a computer-readable medium. The program includes instructions for causing a computer to receive terminal server identification data form a terminal server, to query a database to obtain localized information service data associated with the terminal server identification data, and to send the localized information service data from the host system to the terminal server.

Implementations may include one or more of the following features. A host system database may include records associating terminal server identification data with location data and/or directly associating the identification data with localized information service data. Data connections may be established between a client computer and the terminal server and between the terminal server and a host computer system. The host system may include packet processing circuitry to receive data packets from the terminal server, and to extract terminal server identification data from a header region of the data packet. For example, the host may extract the terminal server's network address from a data packet and is it as the terminal server identifier. The host may query a database based on the terminal server identification data to determine localized information to be sent to the client computer. Localization of particular data services may be done in response to a request originating at a client computer identifying a specific information service. In such a case, the host may obtain localized information service data using a database query based on both the terminal server identification data and the specified information service.

The details of one or more embodiments of the invention are set forth in the accompanying drawings and the description below. Implementations may provide advantages such as facilitating access to localized data without requiring user location input. Other features, objects, and advantages of the invention will be apparent from the description and drawings, and from the claims.

DETAILED DESCRIPTION

Figure 1:
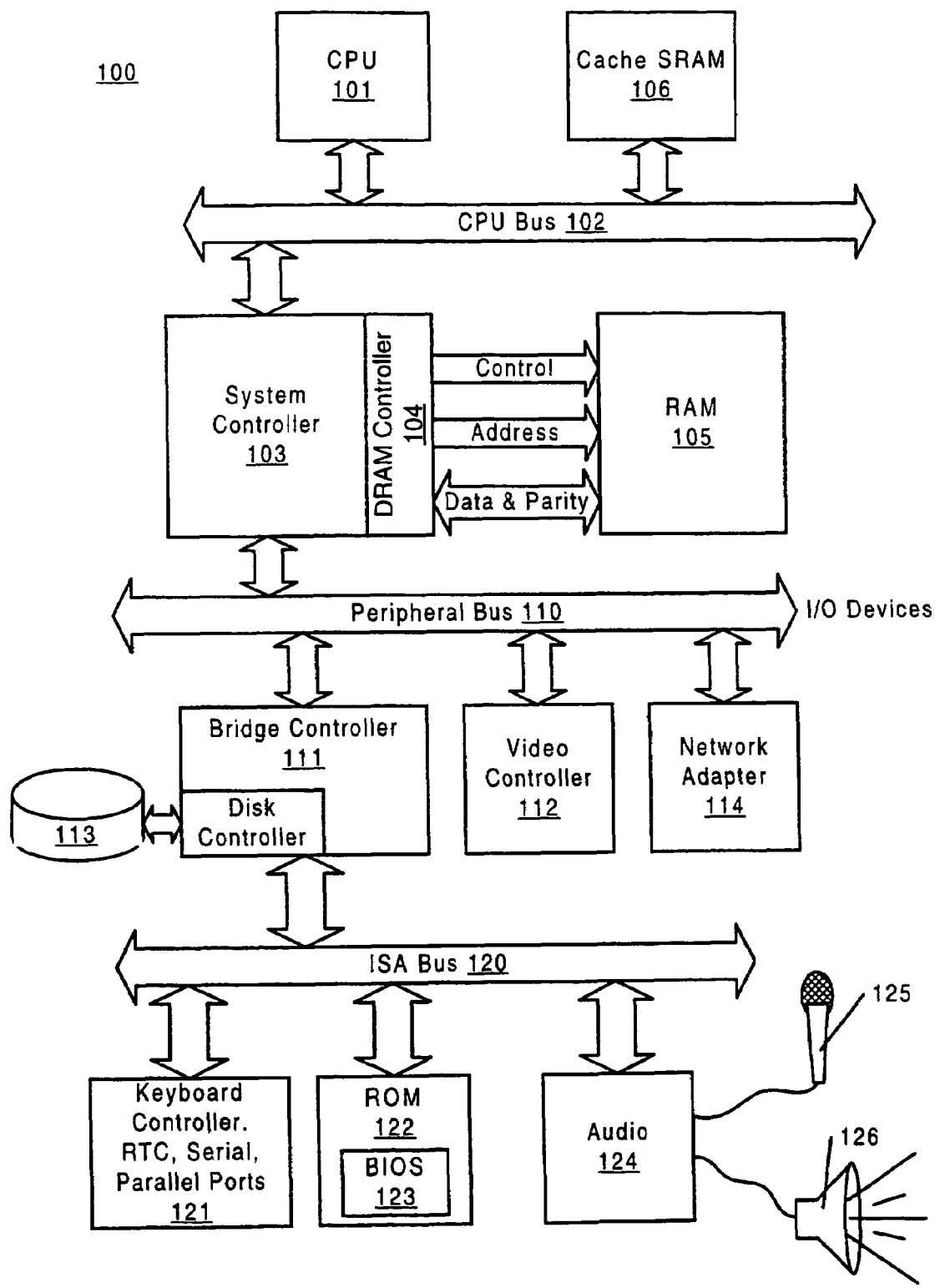
FIG. 1 is a computer hardware diagram.

FIG. 1 depicts physical resources of a computer system 100. The computer 100 has a central processor 101 connected to a processor host bus 102 over which it provides data, address and control signals. The processors 101 may be any conventional general purpose single- or multi-chip microprocessor such as a Pentium® processor, a Pentium® Pro processor, a Pentium II® processor, a MIPS® processor, a Power PC® processor or an Alpha® processor. In addition, the processor 101 may be any conventional special purpose microprocessor such as a digital signal processor or a graphics processor. The microprocessor 101 has conventional address, data, and control lines coupling it to a processor host bus 102.

The computer 100 includes a system controller 103 having an integrated RAM memory controller 104. The system controller 103 is connected to the host bus 102 and provides an interface to random access memory 105. The system controller 103 also provides host bus to peripheral bus bridging functions. The controller 103 thereby permits signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 thereby allows, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a video display controller 112 and network controller 114 can be coupled to the peripheral bus 110. The network controller 114 may be a modem, an Ethernet networking card, a cable modem, or other network access device. The system 100 may also include a secondary peripheral bus 120 coupled to the primary peripheral bus 110 through a bridge controller 111. The secondary peripheral bus 120 can be included in the system 100 to provide additional peripheral device connection points or to connect peripheral devices that are not compatible with the primary peripheral bus 110. For example, in the system 100, the secondary bus 120 may be an ISA bus and the primary bus 110 may be a PCI bus. Such a configuration allows ISA devices to be coupled to the ISA bus 120 and PCI devices to be coupled to the PCI bus 110. The bridge controller 111 can also include a hard disk drive control interface to couple a hard disk 113 to the peripheral bus 110. The computer 100 also includes non-volatile ROM memory 122 to store basic computer software routines. ROM 122 may include alterable memory, such as EEPROM (Electronically Erasable Programmable Read Only Memory), to store configuration data. For example, EEPROM memory may be used to store hard disk 113 geometry and configuration data. BIOS routines 123 are included in ROM 122 and provide basic computer initialization, systems testing, and input/output (I/O) services. For example, BIOS routines 123 may be executed by the processor 101 to process interrupts that occur when the bridge 111 attempts to transfer data from the ISA bus 120 to the host bus 102 via the bridge 111, peripheral bus 110, and system controller 103. The BIOS 123 also includes routines that allow an operating system to be "booted" from the disk 113 or from a server computer using a local area network connection provided by the network adapter 114. The operating system boot operation can occur after the computer 100 is turned on and power-on self-test (POST) routines stored in the BIOS 123 complete execution, or when a reset switch is depressed, or following a software-initiated system reset or a software fault. During the boot process, the processor 101 executes BIOS 123 software to access the disk controller 111 or network controller 114 and thereby obtain a high-level operating system. The high-level operating system is, for example, the Microsoft Disk Operating System (DOS)™, Windows 95™, Windows NT™, a UNIX operating system, the Apple MacOS™ operating system, or other operating system.

An operating system may be fully loaded in the RAM memory 105 or may include portions in RAM memory 105, disk drive storage 113, or storage at a network location. For example, the Microsoft Windows 95™ operating system includes some functionality that remains in memory 105 during the use of Windows 95™ and other functionality that is periodically loaded into RAM memory 105 on an as-needed basis from, for example, the disk 113. An operating system, such as Windows 95™ or Windows NT™ provides functionality to control computer peripherals such as devices 112-1, 14, 12 1, and 124, and to execute user software, scientific software, internet access software, work processing software, and many other types of software. User applications may access computer system peripherals 112-114, 121, and 124 through an application programming interface provided by the operating system and/or may directly interact with underlying computer system 100 hardware.

Figure 2:
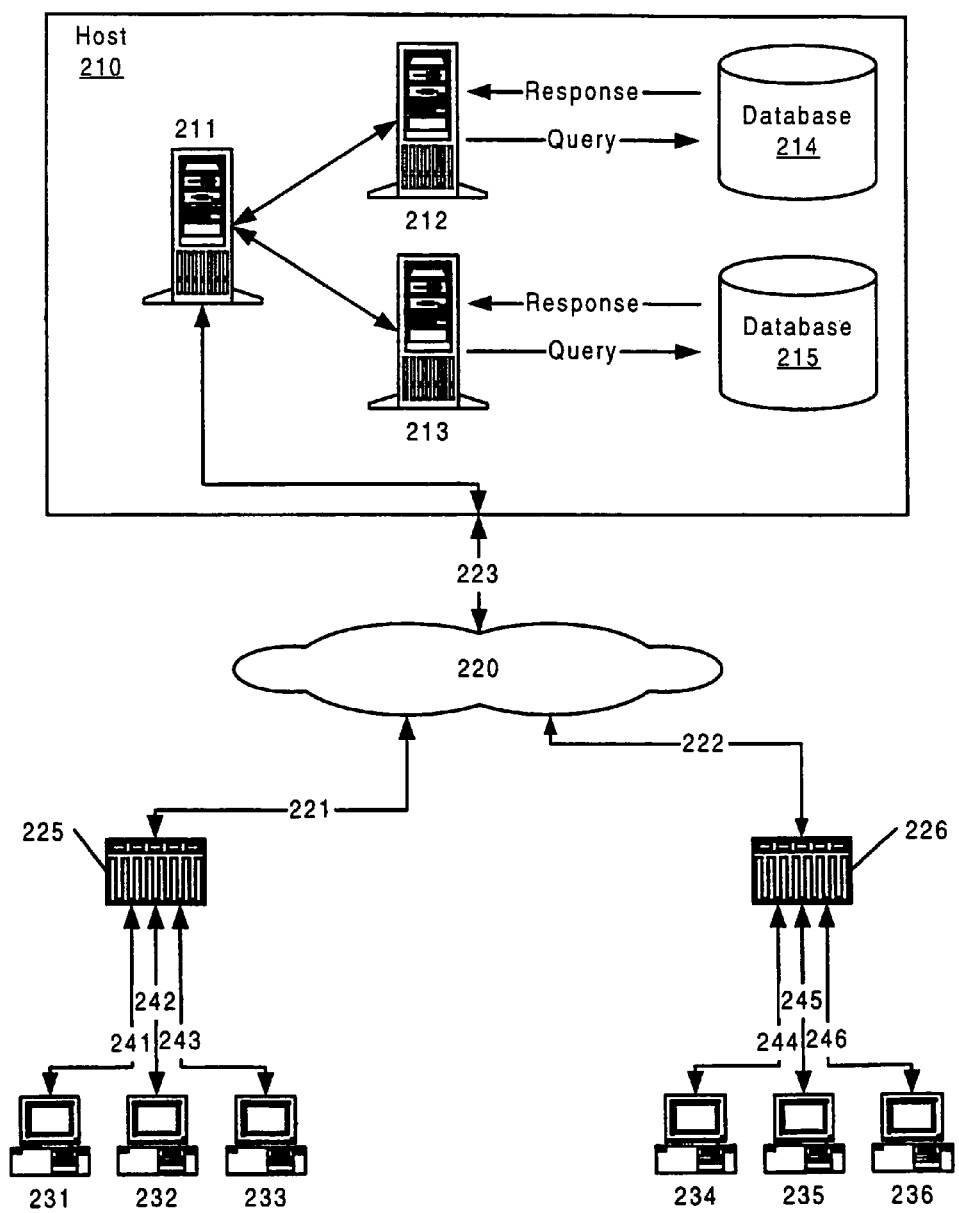
FIG. 2 is a computer network diagram.

A collection of computers 100 can serve as components of a computer network. As shown in FIG. 2, a computer network 200 can include a host computer system 210 and client computers 231-236. The client computers 231-236 can communicate with the host 210 to obtain data stored at the host 210 in databases 214-215. The client computer 231-236 may interact with the host computer 210 as if the host was a single entity in the network 200. However, the host 210 may include multiple processing and database sub-systems that can be geographically dispersed throughout the network 200. For example, a host 210 may include a tightly coupled cluster 21 I-213 of computers 100 (FIG. 1) at a first location that access database systems 2 14-2 15 at remote locations. Each database system 2 14-2 15 may include additional processing components.

Client computers 231-236 can communicate with the host system 210 over, for example, a combination of public switched telephone network dial-up connection and packet network interconnections. For example, client computers 23 I-233 may each include a modem coupled to voiceband telephone line 241-243. To communicate with the host 210, the client computers 231-233 establish a data connection with a local terminal server 225 by dialing a telephone number assigned to the local terminal server 225. A local terminal server 225 may have both dial-up and packet network interfaces allowing the server 225 to receive data from client computers 23 I-233, segment the received data into data packet payload segments, add overhead information to the payload segments, and send the resultant data packets over a link 221 to a packet data network 220 for delivery to the host system 210. Terminal servers 225 and 226 may also be referred to as a network service provider's point-of-presence (POP).

The overhead information added to the payload segments includes a packet header. A packet header includes a destination address assigned to the host system 210 and a source address assigned to the local terminal server 225. Other overhead information may include information associating the data packet with a specific client 231-233. Similarly, the host system 210 may send data to a client 231-233 by segmenting the data into packet payload segments, and adding overhead information to send the data packet to a client 231-234 at the terminal server 225. Client computers 234-236 may similarly exchange data with the host 210 over communications links 244-246 to the terminal server 226.

Data packet formats, switching equipment within the packet network 230, and networking protocols used within the network 200 may conform to the transaction control protocol/internet protocol (TCP/IP). In a TCP/IP implementation, the host 210, packet network 220, terminal servers 225 and 226 are each assigned a unique internet protocol (IP) network address. TCP/IP switching equipment within the network 220 can direct a TCP/IP packet to the intended recipient 210, 225, or 226 based on the packet's destination IP address. Implementations may use other networking protocols and packet formats.

The host computer 210 can provide information services to one or more client computers 231-236. Information services provided by the host 210 include, for example, weather reports, sports team scores, travel, shopping services, games, personal finance, local, national, and international news, local traffic conditions and other general and special interest data services. The America Online® Version 4.0 service, available from America Online, Inc., is an example of an information service using a host system 210 to deliver a broad range of information services to multiple client computers. In an America Online implementation, a client computers 231-236 can be a personal computer such as an Apple Macintosh™ or industry-standard Intel x86 compatible computer. In the America Online Version 4.0 system, client computers execute America Online Version 4.0 client software to access a host system using, for example, a voiceband modem, a cable modem, or a TCP/IP connection.

Information service data provided by a host 210 can include localized data. Localized information service data can be automatically determined based on the location of the terminal server 225-226 or other point-of-presence through which the client accesses the network 200. Automatic localization based on the location of a terminal server or POP allows information service data to be localized without requiring manual location input by a user.

Figure 3:
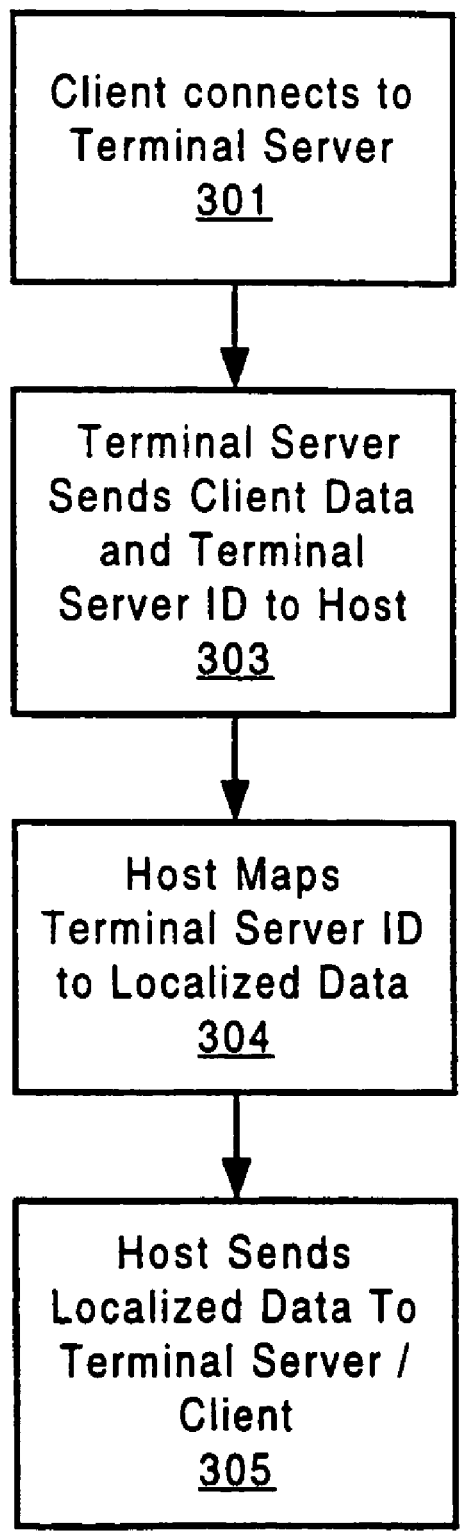
FIG. 3 is a flowchart.

Referring to FIGS. 2 and 3, in an automated localization system, a client 231 connects to a terminal server 225 or other network point-of-presence. The terminal server 225 may then send information between the client 231 and host 210 through the packet network 220. Overhead information in the data packets sent from the terminal server 225 to the host 210 include terminal server identification information, such as the terminal server's network address (step 303). When a data packet is received at the host system 210, the host uses the received terminal server identification information to determine the location of the terminal server 225 (step 304). The host system 210 may then obtain localized data from a database 214 or 215 by querying the database based on the terminal server's location (step 304). The localized data is subsequently sent from the host system to the client computer (step 305).

A host system may include information service databases that directly associates terminal server ID information with localized information service data and can be queried based on the terminal server ID information. In such a case, the determination of a location is implicit in the query for the localized information. Alternatively, a host system may first determine a location based on the terminal server ID and then query an information service database based on the determined location. Other query systems may also be used to map terminal server identification data to localized data.

In an internet protocol (IP) implementation, the terminal server ID information may be an internet protocol (IP) address assigned to the terminal server. The terminal server's IP address may be used to query a host database table that maps IP address information to location information. Table 1 shows an exemplary database table to map IP addresses to locations.

TABLE 1

Exemplary IP to Location Mapping Data

| IP Address | Location | Location Name |
|---|---|---|
| 127. 0. 0. 255 | AA12 | ABC Corporation |
| 255. 255. 255. 0 | BB34 | Anytown USA |
| 64. 112. 15. 86 | AA12 | ABC Corporation |
| 89. 3. 255. * | CD89 | Country Name |
| 77. 4. * * | CA86 | State of ABC |

Using the data in Table 1, a host 210 receiving a data packet from a terminal server having the IP address 127.0.0.255 can map the IP address to a location identifier "AA12." The host may then query an information service database 214 to obtain localized information service data corresponding to the location "AA12." The localized information service data can then be sent back to a client for display to a user. "Wild-card" entries (shown as "*" in Table 1) can allow a broad range of addresses to be mapped to a location identifier. For example, the IP address entry "77.4.*.*" in the fifth row of Table 1 will match any received IP address beginning with "77.4" to the location identifier "CA86."

Implementations may use data other than a network addresses to identify a terminal server. For example, in a simple network management protocol (SNMP) implementation, a SNMP-capable terminal server can access identification data stored in one or more of the terminal server's management information bases (MIBs) and include that identification data in data packets sent to the host 310. For example, a terminal server may access a MIB containing vendor, model, and serial number information for the terminal server and can send the vendor, model, and serial number information to the hosts to be used as a terminal server identifier for localization purposes.

A host system may map a terminal server ID to a physical location or to a logical location. In a physical location mapping implementation, the terminal server ID identifies a geographic location. For example, the terminal server ID may be mapped to a region of a country and weather information service data for that region could be provided to a client. In a logical location mapping implementation, the terminal server ID identifies a logical location such as a corporation. Thus, for example, in a logical mapping implementation, a terminal server may be dedicated to clients from a particular corporation. All clients within that corporation could then receive localized news information service data discussing that corporation.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable integrated circuits).

A number of embodiments of the present invention have been described. Nevertheless, it will be understood that various modifications may be made without departing from the spirit and scope of the invention. For example, the terminal server is not limited to a modem bank. A terminal server may be a proxy server, network gateway, network firewall, or other network element through which client computers connect to a host system and which allow a location to be associated with a client.

What is claimed is:

1. A method for data transfer between a host system, a database, a client computer, and a terminal server, the method comprising:

establishing a data connection between a client computer and a terminal server, the terminal server being disposed in a geographic location;

receiving, at a host system, client data of the client computer and a terminal server identifier of the terminal server, from the terminal server;

determining the geographic location of the terminal server using the terminal server identifier;

querying a database to identify geographic location specific service data associated with the geographic location of the terminal server; and automatically sending the geographic location specific service data associated with the geographic location of the terminal server from the host system to the client computer.

2. The method of claim 1 wherein the database includes a first record that associates the terminal server identifier with the geographic location, and querying the database includes determining the geographic location based on the terminal server identifier from the first record.

3. The method of claim 2 wherein the database further includes a record that associates the geographic location with service data that is specific to the geographic location, and querying the database further comprises determining the geographic location specific service data based on the determined geographic location.

4. The method of claim 1 further comprising:

receiving the geographic location specific service data at the terminal server; and forwarding the geographic location specific service data from the terminal server to the client computer.

5. The method of claim 1, wherein establishing a data connection is carried out prior to receiving the terminal server identifier.

6. The method of claim 1, wherein establishing a data connection further comprises receiving a dial-up modem connection from a client computer.

7. The method of claim 1 wherein the terminal server identifier comprises a network address associated with the terminal server.

8. The method of claim 7 wherein receiving the terminal server identifier further comprises receiving a data packet from the terminal server, the data packet including the terminal server network address.

9. The method of claim 8 wherein the data packet includes request data received at the terminal server from the client computer, the request data identifying an information service.

10. The method of claim 9 wherein querying the database further comprises querying based on the terminal server identifier and the request data; and the geographic location specific service data identifier by the query of the database is associated with both the terminal server identifier and with the service identified by the request data.

11. A host system comprising:

a database including a record associating a terminal server identifier with service data specific to a geographic location;

a data interface configured to exchange data with a terminal server disposed in a geographic location via a communications link; and a processor configured to:

receive client data of a client computer connected to the terminal server via a data connection and the terminal server identifier of the terminal server via the data interface, determine the geographic location of the terminal server using the terminal server identifier, query the database to identify geographic location specific service data associated with the geographic location of the terminal server, and automatically send the geographic location specific service data associated with the geographic location of the terminal server to the client computer via the data interface.

12. The host system of claim 11 wherein:

the terminal server identifier comprises a network address associated with the terminal server; and the interface includes packet processing circuitry to receive a data packet from the terminal server and extract the terminal server identifier from a header region of the data packet.

13. The host system of claim 12 wherein the network address comprises an internet protocol address.

14. The host system of claim 11 wherein the database includes a disk storage medium comprising a plurality of records associating terminal server identifiers with geographic locations and a plurality of records associating geographic locations with service data.

15. The host system of claim 14 further comprising a software storage medium coupled to the processor, the media storing instructions to configure the processor to query the database, instructions to retrieve geographic locations associated with terminal server identifiers and instructions to query the database to retrieve service data associated with geographic locations.

16. A computer-readable medium having stored therein a computer program comprising computer instructions to be executed by a computer for causing the computer to:

establish a data connection between a client computer and a terminal server, the terminal server being disposed in a geographic location;

receive client data of the client computer and a terminal server identifier of the terminal server, from the terminal server;

determine the geographic location of the terminal server using the terminal serve identifier;

query a database to identify geographic location specific service data associated with the geographic location of the terminal server; and automatically send the geographic location specific service data associated with the geographic location of the terminal server to the client computer.

17. The computer-readable medium of claim 16 wherein the instructions to query the database comprise instructions to query the database to determine the geographic location based on the received terminal server identifier.

18. The computer-readable medium of claim 16 wherein the terminal server identifier comprises a network address associated with the terminal server.

19. The computer-readable medium of claim 16 wherein the instructions to receive the terminal server identifier comprises instructions to receive a data packet from the terminal server, the data packet including a terminal server network address.

20. The computer-readable medium of claim 19 wherein the data packet further comprises request data received at the terminal server from a client computer, the request data identifying a service.

21. The computer-readable medium of claim 20 wherein:

the instructions to query the database comprise instructions to query the database based on the terminal server identifier and the request data; and the geographic location specific service data identified by the query is associated with both the terminal server identifier and with the service identified by the request data.

22. A method for data transfer between a host system, a database, a client computer, and a terminal server, the method comprising:

establishing a data connection between a client computer and a terminal server, the terminal server being disposed in a geographic location;

receiving, at a host system, client data of the client computer and a terminal server identifier of the terminal server, from the terminal server;

determining, at the host system, the geographic location of the terminal server using the terminal server identifier;

maintaining, at the host system, the geographic location specific service data;

querying, at the host system, a database to identify the geographic location specific service data associated with the geographic location of the terminal server; and automatically sending the geographic location specific service data associated with the geographic location of the terminal server from the host system to the client computer;

wherein the host system is a single source for accessing the geographic location of the terminal server, maintaining the geographic location specific service data, and sending the geographic location specific service data to the terminal server.

23. The method as in claim 22 further comprising:

establishing a data connection between the terminal server and the client computer;

receiving the geographic location specific data at the terminal server; and forwarding the geographic location specific service data from the terminal server to the client computer.

24. The method as in claim 22 wherein the terminal server identifier includes a network address associated with the terminal server.

* * * * *